(12) United States Patent
Chen et al.

(10) Patent No.: US 9,841,008 B2
(45) Date of Patent: Dec. 12, 2017

(54) SOLAR AND STEAM HYBRID POWER GENERATION SYSTEM

(71) Applicant: WUHAN KAIDI ENGINEERING TECHNOLOGY RESEARCH INSTITUTE CO., LTD., Wuhan (CN)

(72) Inventors: Yilong Chen, Wuhan (CN); Qingping Yang, Wuhan (CN); Yanfeng Zhang, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 352 days.

(21) Appl. No.: 14/302,419

(22) Filed: Jun. 11, 2014

(65) Prior Publication Data
US 2014/0290246 A1 Oct. 2, 2014

Related U.S. Application Data

(63) Continuation-in-part of application No. PCT/CN2012/083116, filed on Oct. 18, 2012.

(30) Foreign Application Priority Data

Dec. 12, 2011 (CN) .......................... 2011 1 0411979
Dec. 12, 2011 (CN) ..................... 2011 2 0515674 U

(51) Int. Cl.
*F01D 21/00* (2006.01)
*F01D 19/00* (2006.01)
(Continued)

(52) U.S. Cl.
CPC .............. *F03G 6/00* (2013.01); *F01D 17/00* (2013.01); *F01D 17/02* (2013.01); *F01D 17/04* (2013.01);
(Continued)

(58) Field of Classification Search
CPC .......... F03G 6/003; F03G 6/005; F22B 1/006; Y02E 10/41; Y02E 10/44; Y02E 20/16;
(Continued)

(56) References Cited

U.S. PATENT DOCUMENTS

| 3,953,966 A | * | 5/1976 | Martz | ..................... | F01K 13/02 |
| | | | | | 60/39.182 |
| 2005/0126170 A1 | * | 6/2005 | Litwin | .................... | F03G 6/065 |
| | | | | | 60/641.8 |

(Continued)

FOREIGN PATENT DOCUMENTS

CN 201827035 U * 5/2011 ............. Y02E 10/46

*Primary Examiner* — Mark Laurenzi
*Assistant Examiner* — Wesley Harris
(74) *Attorney, Agent, or Firm* — Matthias Scholl P.C.; Matthias Scholl

(57) ABSTRACT

Solar and steam hybrid power generation system including a solar steam generator, an external steam regulator, a turboset, and a power generator. A steam outlet end of the solar steam generator is connected to a steam inlet of the turboset. A steam outlet end of the external steam regulator is connected to the steam inlet of the turboset. A steam outlet of the turboset is connected to the input end of a condenser, and the output end of the condenser is connected to the input end of a deaerator. The output end of the deaerator is connected to the input end of a water feed pump. The output end of the water feed pump is connected to a circulating water input end of the solar steam generator. The output end of the water feed pump is connected to a water-return bypass of the external steam.

15 Claims, 4 Drawing Sheets

(51) Int. Cl.
*F01D 17/00* (2006.01)
*F03G 6/00* (2006.01)
*F01D 17/04* (2006.01)
*F01D 17/02* (2006.01)
*F01D 17/08* (2006.01)
*F01K 11/02* (2006.01)
*F24J 2/07* (2006.01)
*F22B 1/00* (2006.01)
*F01D 19/02* (2006.01)
*F01D 17/06* (2006.01)
*F03G 6/06* (2006.01)

(52) U.S. Cl.
CPC .............. *F01D 17/06* (2013.01); *F01D 17/08* (2013.01); *F01D 17/085* (2013.01); *F01D 19/00* (2013.01); *F01D 19/02* (2013.01); *F01D 21/00* (2013.01); *F01K 11/02* (2013.01); *F03G 6/003* (2013.01); *F03G 6/005* (2013.01); *F03G 6/06* (2013.01); *F03G 6/065* (2013.01); *F03G 6/067* (2013.01); *F22B 1/006* (2013.01); *F24J 2/07* (2013.01); *Y02E 10/41* (2013.01); *Y02E 10/44* (2013.01); *Y02E 10/46* (2013.01); *Y02E 20/16* (2013.01); *Y02P 80/154* (2015.11)

(58) Field of Classification Search
CPC ........... F24J 2/07; F01D 17/00–17/085; F01D 19/00–19/02; F01D 21/00–21/20
USPC ............................ 60/641.8–641.15, 660–667
See application file for complete search history.

(56) References Cited

U.S. PATENT DOCUMENTS

2008/0029150 A1* 2/2008 Quero ...................... F03G 6/065
 136/248
2011/0277469 A1* 11/2011 Brenmiller ............... F03G 6/067
 60/641.8

* cited by examiner

SOLAR AND STEAM HYBRID POWER GENERATION SYSTEM

CROSS-REFERENCE TO RELATED APPLICATIONS

This application is a continuation-in-part of International Patent Application No. PCT/CN2012/083116 with an international filing date of Oct. 18, 2012, designating the United States, now pending, and further claims priority benefits to Chinese Patent Application No. 201110411979.8 filed Dec. 12, 2011, and to Chinese Patent Application No. 201120515674.7 filed Dec. 12, 2011. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

Field of the Invention

The invention relates to a power generation system using clean energy, and more particularly to a solar and external steam hybrid power generation system.

Background of the Invention

With the decrease of reserves of traditional fossil fuels (coal, oil, natural gas), it has been the focus of widespread concern to look for a clean and renewable energy source. Additionally, as environmental pollution caused by the use of fossil energy directly threatens human survival and development, it has become a worldwide consensus to emphasize and develop a clean and renewable energy and to decrease the emission of $SO_2$ and $CO_2$.

Solar energy is advantageous for obvious reasons. However, a large-scale development and utilization of concentrating solar power (CSP) have been largely restricted due to problems such as decentralization of the solar energy, strong dependence on weather, and instability and discontinuity of thermal concentration. In modern large-scale industrial production, a large amount of waste steam byproducts is produced, which has a very low utilization ratio. Thus, how to combine the waste steam with the CSP is an urgent problem to be solved for researchers in the technical field.

SUMMARY OF THE INVENTION

In view of the above-described problems, it is one objective of the invention to provide a solar and external steam hybrid power generation system that can fully utilize waste heat produced by large-scale industrial production to overcome the shortcomings of conventional solar thermal power plants such as the dependence on weather and unstable and discontinuous thermal concentration.

To achieve the above objective, in accordance with one embodiment of the invention, there is provided a solar and external steam hybrid power generation system, comprising a solar steam generator, an external steam regulator, a turboset, and a power generator coupled to the turboset. A steam outlet end of the solar steam generator is connected to a high pressure steam inlet of the turboset via a first regulating valve. A steam outlet end of the external steam regulator is also connected to the high pressure steam inlet of the turboset via a second regulating valve and a second switch valve. A low pressure steam outlet of the turboset is connected to an input end of a condenser, and an output end of the condenser is connected to an input end of a deaerator. An output end of the deaerator is connected to an input end of a water feed pump. An output end of the water feed pump is connected to a circulating water input end of the solar steam generator via a first switch valve. The output end of the water feed pump is further connected to a water-return bypass of the external steam via a fourth switch valve whereby forming a circulation loop for the work of the external steam. The external steam regulator is configured to adjust the working conditions of the external steam so that the pressure and temperature of the external steam can meet the operating requirements of the turboset. Based on different working conditions, the external steam regulator is a temperature-decreased pressure reducer or a heat booster. The deaerator is configured to remove oxygen in the circulating water thereby preventing devices and pipes from oxidation and corrosion.

In a class of this embodiment, the system further comprises a soft water storage tank. A water outlet of the soft water storage tank is connected a water inlet of the deaerator via a water supply pump, and a first pipe connecting the water outlet of the soft water storage tank and the water inlet of the deaerator is provided with a third regulating valve and a third switch valve. Consequently, a storage and replenishment system for the circulating water of the solar steam generator is constituted. The soft water storage tank is configured to store soft water prepared by a chemical water treatment device where the calcium and magnesium ions are removed, which can effectively prevent the internal fouling. The third regulating valve and the third switch valve control the supply and the flow rate of the soft water to supplement the circulating water according to actual loss.

In a class of this embodiment, a second pipe close to the high pressure steam inlet of the turboset is provided with a pressure manometer and a thermometer. The arrangement of the pressure manometer and the thermometer is beneficial to the control of the pressure and temperature of the steam introduced to the turboset thereby meeting the operating requirements of the turboset.

In a class of this embodiment, the solar steam generator comprises an overhead solar boiler and a plurality of heliostats matching therewith; an output end of a heat pipe of the overhead solar boiler is connected to the high pressure steam inlet of the turboset via the first regulating valve; and an input end of the heat pipe of the overhead solar boiler is connected to the output end of the water feed pump via the first switch valve. The thermal medium in the overhead solar boiler is water, no heat exchanger is involved, and the water is directly vaporized to yield high temperature and high pressure steam to drive the turboset. Thus, the power generation system has a simple structure and low production costs.

In a class of this embodiment, the solar steam generator comprises an overhead solar boiler and a plurality of heliostats matching therewith; an output end of a heat pipe of the overhead solar boiler is connected to a thermal medium inlet of a regenerative heat exchanger via a fifth switch valve, and a thermal medium outlet of the regenerative heat exchanger is connected to an input end of the heat pipe of the overhead solar boiler via a heat pump; a steam outlet of the regenerative heat exchanger is connected to the high pressure steam inlet of the turboset via the first regulating valve; and a circulating water inlet of the regenerative heat exchanger is connected to the output end of the water feed pump via the first switch valve. The overhead soar boiler employs high temperature heat conduction oil as the thermal medium, such as heavy oil, paraffin, molten salts, liquid, or other known thermally conductive liquid mixture. For example, the heating temperature of a mixture of biphenyl and diphenyl oxide can reach 400° C. The high temperature thermal medium absorbs the solar energy and passes the thermal energy on to the water by means of the regenerative heat exchanger. The water is vaporized to yield high temperature and high pressure steam to drive the turboset to work stably, safely, and reliably.

In a class of this embodiment, the solar steam generator comprises a plurality of solar vacuum heat pipes and a plurality of trough type parabolic reflectors matching therewith; output ends of the solar vacuum heat pipes are connected to the high pressure steam inlet of the turboset via the first regulating valve; and input ends of the solar vacuum heat pipes are connected to the output end of the water feed pump via the first switch valve. The thermal medium in the overhead solar boiler is water, no heat exchanger is involved, and the water is directly vaporized to yield high temperature and high pressure steam to drive the turboset. Thus, the power generation system has a simple structure and low production costs.

In a class of this embodiment, the solar steam generator comprises a plurality of solar vacuum heat pipes and a plurality of trough type parabolic reflectors matching therewith; output ends of solar vacuum heat pipes are connected to a thermal medium inlet of a regenerative heat exchanger via a fifth switch valve, and a thermal medium outlet of the regenerative heat exchanger is connected to input ends of the solar vacuum heat pipes via a heat pump; a steam outlet of the regenerative heat exchanger is connected to the high pressure steam inlet of the turboset via the first regulating valve; and a circulating water inlet of the regenerative heat exchanger is connected to the output end of the water feed pump via the first switch valve. The overhead soar boiler employs high temperature heat conduction oil as the thermal medium, such as heavy oil, paraffin, molten salts, liquid, or other known thermally conductive liquid mixture. For example, the heating temperature of a mixture of biphenyl and diphenyl oxide passes the thermal energy on to the water by means of the regenerative heat exchanger. The water is vaporized to yield high temperature and high pressure steam to drive the turboset to work stably, safely, and reliably.

Working principle of the solar and external steam hybrid power generation system is described as follows. In daytimes when the sunlight is abundant, the second switch valve and the fourth switch valve are close, the first switch valve is open, and the solar steam generator operates to yield a high temperature and high pressure steam. The high temperature and high pressure steam is regulated by the first regulating valve to reach a rated pressure and a rated temperature, and transported to the turboset to do work for generating power. Steam after doing work is cooled by the condenser to form normal pressure and low temperature water which is transported to the deaerator for removal of the dissolved oxygen and then transported back to the solar steam generator via the water feed pump and the first switch valve for a next circulation. When the circulating water is required to be supplied, the third switch valve is open, and the soft water stored in the soft water storage tank is sucked by the water supply pump and is transported to the deaerator. The flow rate of the circulating water is regulated by the third regulating valve.

In night or rainy and cloudy days, the first switch valve is close, the first regulating valve stays at zero positions, the second switch valve and the fourth switch valve are open, and thus the external steam is introduced. The waste steam from large-scale industrial production is regulated by the external steam regulator and the second regulating valve to reach the rated pressure and rated temperature, and then transported to the turboset via the second switch valve to do work. The steam after doing work is cooled by the condenser to form normal pressure and low temperature water which is transported to the deaerator for removal of the dissolved oxygen and then transported back to the water-return bypass of the external steam via the water feed pump and the fourth switch valve whereby achieving the do-work circulation of the external steam.

Compared with the prior art, advantages of the invention are summarized as follows: the steam power of the designed power generation system comes from the clean and renewable power energy as well as the waste steam of the modern large-scale industrial byproduct. Compared with the power generation using the conventional fossil energy, not only is the emission of the $SO_2$ and $CO_2$ polluting the atmosphere avoided but also the waste heat resource is fully collected and utilized. Besides, the influence of fluctuation of the climate on the solar energy is alleviated. Thus, whenever day and night and whenever sunny day and cloudy day, the turboset is capable of stably running for power generation.

DETAILED DESCRIPTION OF THE EMBODIMENTS

For further illustrating the invention, experiments detailing a solar and external steam hybrid power generation system are described below. It should be noted that the following examples are intended to describe and not to limit the invention.

Example 1

Figure 1:
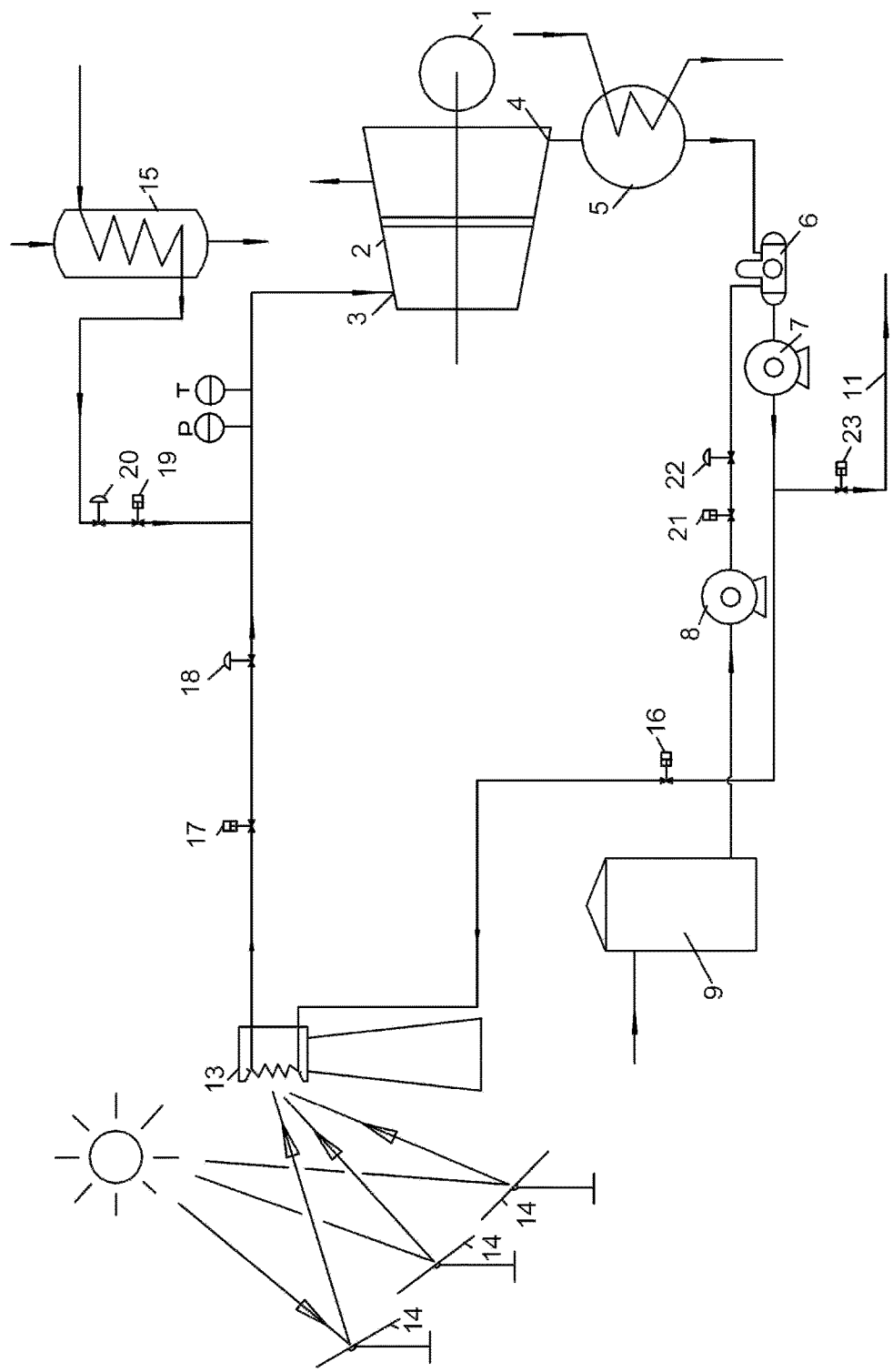
FIG. 1 is a schematic diagram of a solar and external steam hybrid power generation system according to Example 1 of the invention, in which, an overhead solar boiler matching heliostats directly supplies steam for a turboset.

As shown in FIG. 1, a solar and external steam hybrid power generation system primarily comprises: a solar steam generator, an external steam regulator 15, a turboset 2, and a power generator 1 coupled to the turboset 2, a condenser 5, a deaerator 6, a water feed pump 7, a soft water storage tank 9, and a water supply pump 8, which are assembled by pipes and valves. The valves comprise a first switch valve 16, a second switch valve 19, a third switch valve 21, a fourth switch valve 23, and a fifth switch valve 17 for controlling connection and disconnection of the pipes, and a first regulating valve 18, a second regulating valve 20, and a third regulating valve 22 for regulating the flow rate in the pipes.

The solar steam generator further comprises an overhead solar boiler 13 and a plurality of heliostats 14 matching therewith. The heliostats 14 are capable of tracing the sun to enable the sunlight to always concentrate on a heat pipe of the overhead solar boiler 13. An output end of the heat pipe of the overhead solar boiler 13 is connected to a high pressure steam inlet 3 of the turboset 2 via the fifth switch valve 17 and the first regulating valve 18. A steam outlet end of the external steam regulator 15 is also connected to the high pressure steam inlet 3 of the turboset 2 via the second regulating valve 20 and the second switch valve 19. A second pipe close to the high pressure steam inlet 3 of the turboset 2 is provided with a pressure manometer P and a thermometer T for directly displaying pressure and temperature parameters of the steam.

A low pressure steam outlet 4 of the turboset 2 is connected to an input end of the condenser 5, and an output end of the condenser 5 is connected to an input end of the deaerator 6. A water outlet of the soft water storage tank 9 is connected a water inlet of the deaerator 6 via a water supply pump 8. The third regulating valve 22 and the third switch valve 21 are disposed on a first pipe connecting the water outlet of the soft water storage tank 9 and the water inlet of the deaerator 6 for controlling the open and close of a water supply pipe and the volume of the supplying water. An output end of the deaerator 6 is connected to an input end of the water feed pump 7; and an output end of the water feed pump 7 is connected to an input end of the heat pipe of the overhead solar boiler 13 via the first switch valve 16, thereby forming a circulation loop of the solar steam generator. The output end of the water feed pump 7 is further connected to a water-return bypass 11 of the external steam via the fourth switch valve 23, thereby forming a circulation loop for the work of the external steam.

Working process of the solar and external steam hybrid power generation system of Example 1 is as follows: in daytimes when the sunlight is abundant, the second switch valve 19 and the fourth switch valve 23 are close, the first switch valve 16, the third switch valve 21, and the fifth switch valve 17 are open, and the system runs at a concentrating solar thermal power generation state. At the time, the heliostats 14 trace the sunlight and concentrate the thermal energy of the sunlight on the heat pipe of the overhead solar boiler 13 to heat the circulating water therein to form a high temperature and high pressure steam. The high temperature and high pressure steam is output from the heat pipe of the overhead solar boiler 13, regulated by the first regulating valve 18 to reach a rated pressure and a rated temperature, and transported to the turboset 2 to do work for generating power. Steam after doing work is cooled by the condenser 5 to form normal pressure and low temperature water at approximately 40° C. which is transported to the deaerator 6 for removal of the dissolved oxygen and then transported back to the heat pipe of the overhead solar boiler 13 via the water feed pump 7 for a next circulation. Meanwhile, surface water or well water is collected, preliminarily purified, treated by a chemical water treatment plant for removing calcium and magnesium ions therein, and transported and stored in the soft water storage tank 9. When water is required to be supplied, soft water is sucked by the water supply pump 8, a flow rate of the water is then regulated by the third regulating valve 22, and the soft water is transported to the deaerator 6 for supplementing the water loss.

At night or in rainy and cloudy days, the first switch valve 16, the third switch valve 21, and the fifth valve 17 are close, the first regulating valve 18 and the third regulating valve 22 stay at zero positions, the second switch valve 19 and the fourth switch valve 23 are open, and the system runs at the external steam power generation state. An external waste steam is introduced to the external steam regulator 15 for decreasing pressure and temperature or increasing pressure and temperature according to practical working condition of the waste steam, then fine regulated by the second regulating valve to reach the rated pressure and rated temperature, and transported to the turboset 2 to do work. The steam after doing work is cooled by the condenser 5 to form normal pressure and low temperature water at approximately 40° C. which is transported to the deaerator 6 for removal of the dissolved oxygen and then transported back to the external waste steam source via the water feed pump 7 and the water-return bypass 11 of the external steam or transported and stored in the soft water storage tank 9.

Example 2

Figure 2:
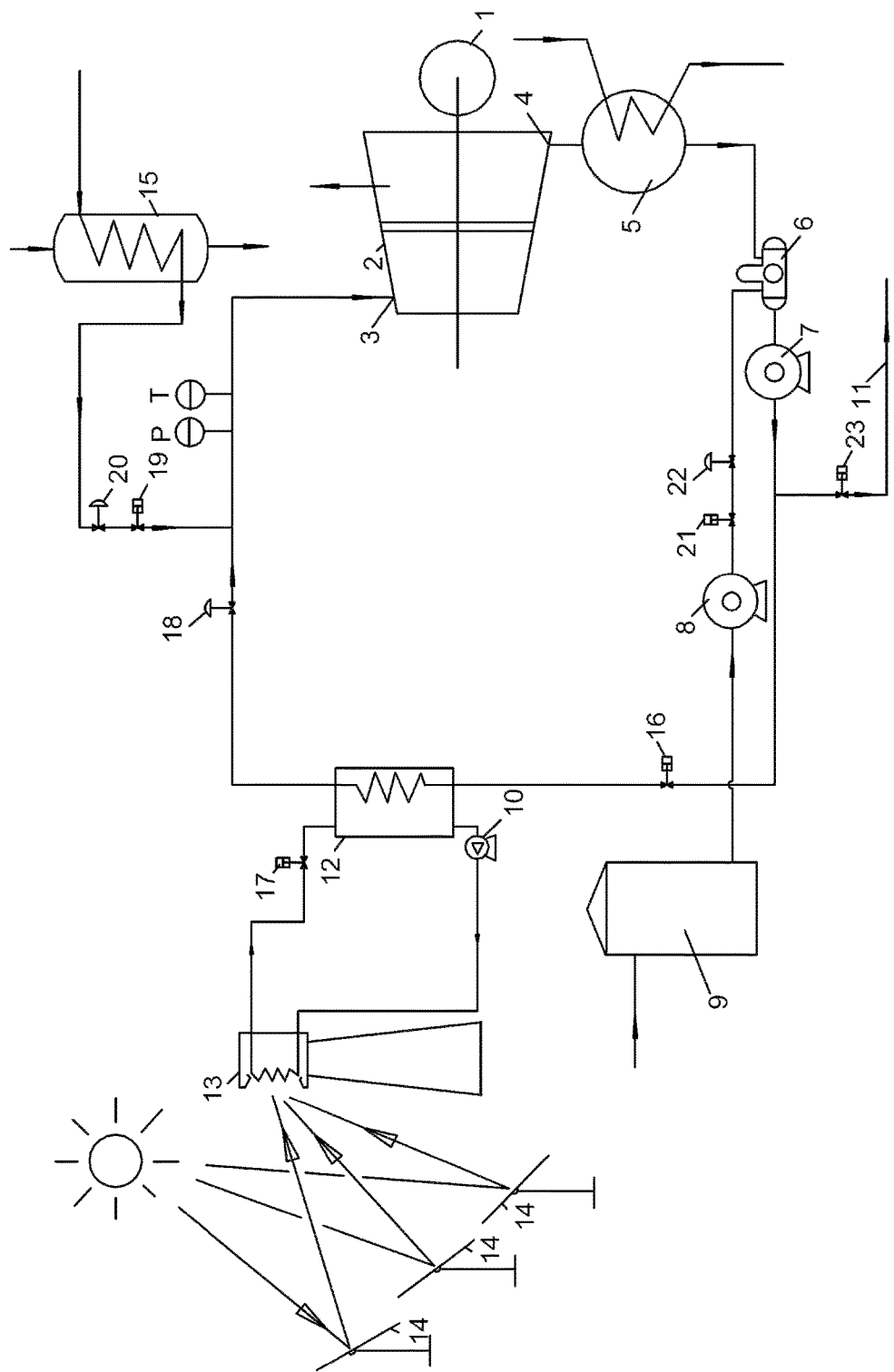
FIG. 2 is a schematic diagram of a solar and external steam hybrid power generation system according to Example 2 of the invention, in which, an overhead solar boiler matching heliostats indirectly supplies steam for a turboset through heat exchange.

As shown in FIG. 2, a solar and external steam hybrid power generation system primarily comprises: a solar steam generator, an external steam regulator 15, a turboset 2, and a power generator 1 coupled to the turboset 2, a condenser 5, a deaerator 6, a water feed pump 7, a soft water storage tank 9, and a water supply pump 8, which are assembled by pipes and valves. The valves comprise a first switch valve 16, a second switch valve 19, a third switch valve 21, a fourth switch valve 23, and a fifth switch valve 17 for controlling connection and disconnection of the pipes, and a first regulating valve 18, a second regulating valve 20, and a third regulating valve 22 for regulating the flow rate in the pipes.

The solar steam generator further comprises an overhead solar boiler 13 and a plurality of heliostats 14 matching therewith. The heliostats 14 are capable of tracing the sun to enable the sunlight to always concentrate on a heat pipe of the overhead solar boiler 13. An output end of a heat pipe of the overhead solar boiler 13 is connected to a thermal medium inlet of a regenerative heat exchanger 12 via the fifth switch valve 17, and a thermal medium outlet of the regenerative heat exchanger 12 is connected to an input end of the heat pipe of the overhead solar boiler 13 via a heat pump 10. The thermal medium is a mixed solution comprising biphenyl and diphenyl oxide filled in the regenerative heat exchanger 12 provided with a heat insulation layer. When the thermal medium absorbs heat, a temperature thereof increases to approximately 400° C., which is enough to be used for heat exchange to produce high temperature and high pressure steam. A steam outlet of the regenerative heat exchanger 12 is connected to the high pressure steam inlet 3 of the turboset 2 via the first regulating valve 18. A steam outlet end of the external steam regulator 15 is also connected to the high pressure steam inlet 3 of the turboset 2 via the second regulating valve 20 and the second switch valve 19. A second pipe close to the high pressure steam inlet 3 of the turboset 2 is provided with a pressure manometer P and a thermometer T for directly displaying pressure and temperature parameters of the steam.

A low pressure steam outlet 4 of the turboset 2 is connected to an input end of the condenser 5, and an output end of the condenser 5 is connected to an input end of the deaerator 6. A water outlet of the soft water storage tank 9 is connected a water inlet of the deaerator 6 via a water supply pump 8. The third regulating valve 22 and the third switch valve 21 are disposed on a first pipe connecting the water outlet of the soft water storage tank 9 and the water inlet of the deaerator 6 for controlling the open and close of a water supply pipe and the volume of the supplying water. An output end of the deaerator 6 is connected to an input end of the water feed pump 7; and an output end of the water feed pump 7 is connected to a circulating water inlet of the regenerative heat exchanger 12 via the first switch valve 16, thereby forming a circulation loop of the solar steam generator. The output end of the water feed pump 7 is further connected to a water-return bypass 11 of the external steam via the fourth switch valve 23, thereby forming a circulation loop for the work of the external steam.

Working process of the solar and external steam hybrid power generation system of Example 2 is as follows: in daytimes when the sunlight is abundant, the second switch valve 19 and the fourth switch valve 23 are close, the first switch valve 16, the third switch valve 21, and the fifth switch valve 17 are open, and the system runs at a concentrating solar thermal power generation state. At the time, the heliostats 14 trace the sunlight and concentrate the thermal energy of the sunlight on the heat pipe of the overhead solar boiler 13 to enable the thermal medium therein, the mixed solution comprising biphenyl and diphenyl oxide, to absorb heat. The mixed solution comprising biphenyl and diphenyl oxide heated to approximately 400° C. flows to the regenerative heat exchanger 12 via the fifth switch valve 17 and exchanges heat with the circulating water in another pipe of the regenerative heat exchanger 12. Thus, the temperature of the mixed solution comprising biphenyl and diphenyl oxide gradually decreases, approximately 245° C. after flowing out of the regenerative heat exchanger 12. The mixed solution comprising biphenyl and diphenyl oxide is transported back to the heat pipe of the overhead solar boiler 13 by the drive of the heat pump 10, for a next circulation of solar energy absorption. The circulating water in the regenerative heat exchanger 12 is transformed into the high temperature and high pressure steam after the heat exchange with the high temperature mixed solution comprising biphenyl and diphenyl oxide. The high temperature and high pressure steam is output from the regenerative heat exchanger 12, regulated by the first regulating valve 18 to reach a rated pressure and a rated temperature, and then transported to the turboset 2 to do work. Steam after doing work is cooled by the condenser 5 to form normal pressure and low temperature water at approximately 40° C. which is transported to the deaerator 6 for removal of the dissolved oxygen and then transported back to the regenerative heat exchanger 12 for heat exchange via the water feed pump 7, thereby forming high temperature and high pressure steam again. Meanwhile, surface water or well water is collected, preliminarily purified, treated by chemical water treatment plant for removing calcium and magnesium ions therein, and transported and stored in the soft water storage tank 9. When water is required to be supplied, soft water is sucked by the water supply pump 8, a flow rate of the soft water is then regulated by the third regulating valve 22, and the soft water is transported to the deaerator 6 for supplementing the water loss.

At night or in rainy and cloudy days, the first switch valve 16, the third switch valve 21, and the fifth valve 17 are close, the first regulating valve 18 and the third regulating valve 22 stay at zero positions, the second switch valve 19 and the fourth switch valve 23 are open, and the system runs at the external steam power generation state. An external waste steam is introduced to the external steam regulator 15 for decreasing pressure and temperature or increasing pressure and temperature according to practical working condition of the waste steam, then fine regulated by the second regulating valve to reach the rated pressure and rated temperature, and transported to the turboset 2 to do work. The steam after doing work is cooled by the condenser 5 to form normal pressure and low temperature water at approximately 40° C. which is transported to the deaerator 6 for removal of the dissolved oxygen and then transported back to the external waste steam source via the water feed pump 7 and the water-return bypass 11 of the external steam or transported and stored in the soft water storage tank 9.

Example 3

Figure 3:
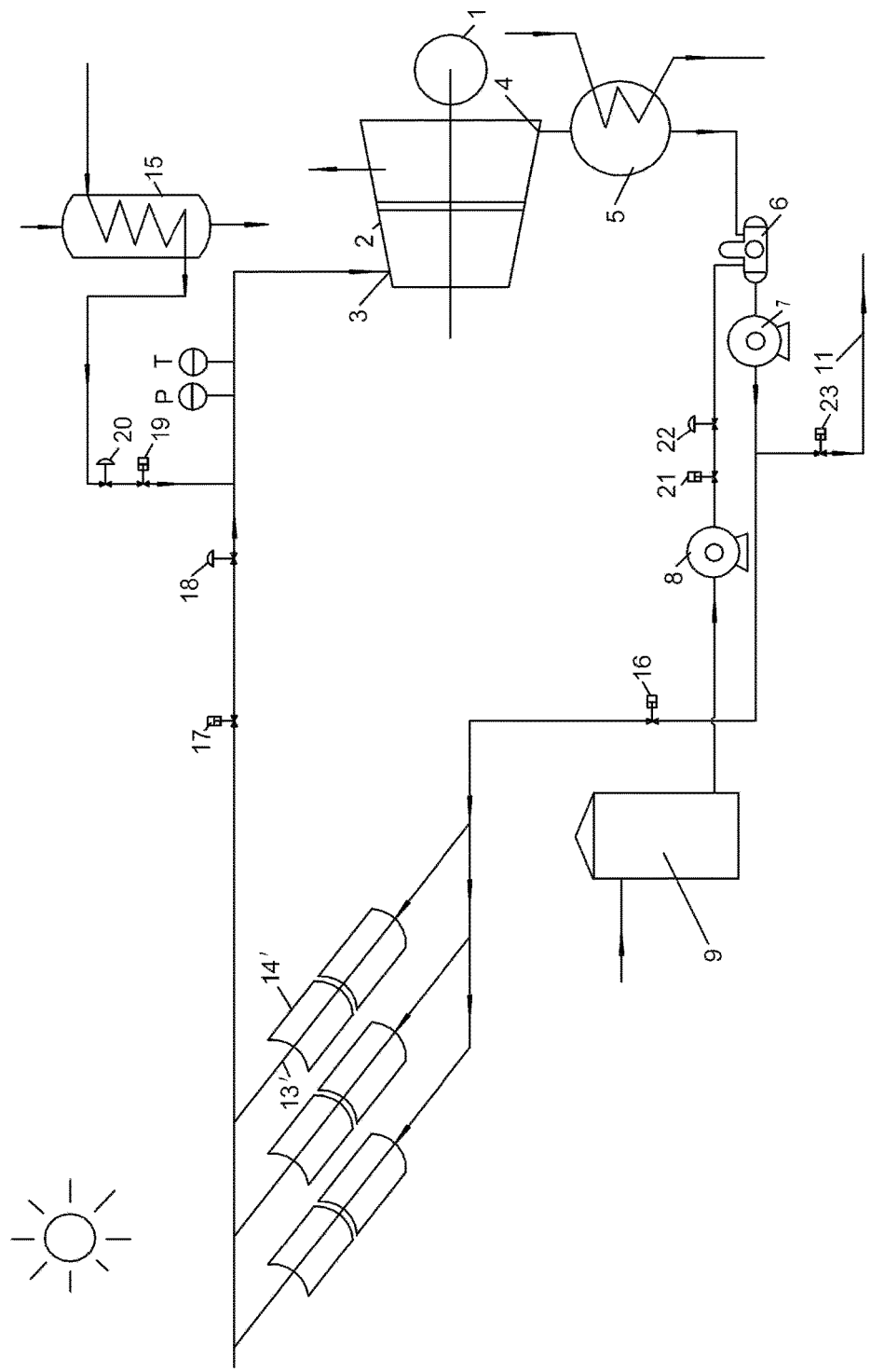
FIG. 3 is a schematic diagram of a solar and external steam hybrid power generation system according to Example 3 of the invention, in which, solar vacuum heat pipes matching trough type parabolic reflectors directly supplies steam for a turboset.

As shown in FIG. 3, a structure of a solar and external steam hybrid power generation system is basically the same as that shown in FIG. 1 except for some slight variations that the solar steam generator comprises a plurality of solar vacuum heat pipes 13' and a plurality of trough type parabolic reflectors 14' matching therewith. Output ends of the solar vacuum heat pipes 13' are connected to the high pressure steam inlet 3 of the turboset 2 via the fifth switch valve 17 and the first regulating valve 18. Input ends of the solar vacuum heat pipes 13' are connected to the output end of the water feed pump 7 via the first switch valve 16. Working processes of the two solar and external steam hybrid power generation systems are basically the same, so that it will not be repeatedly illustrated herein.

Example 4

Figure 4:
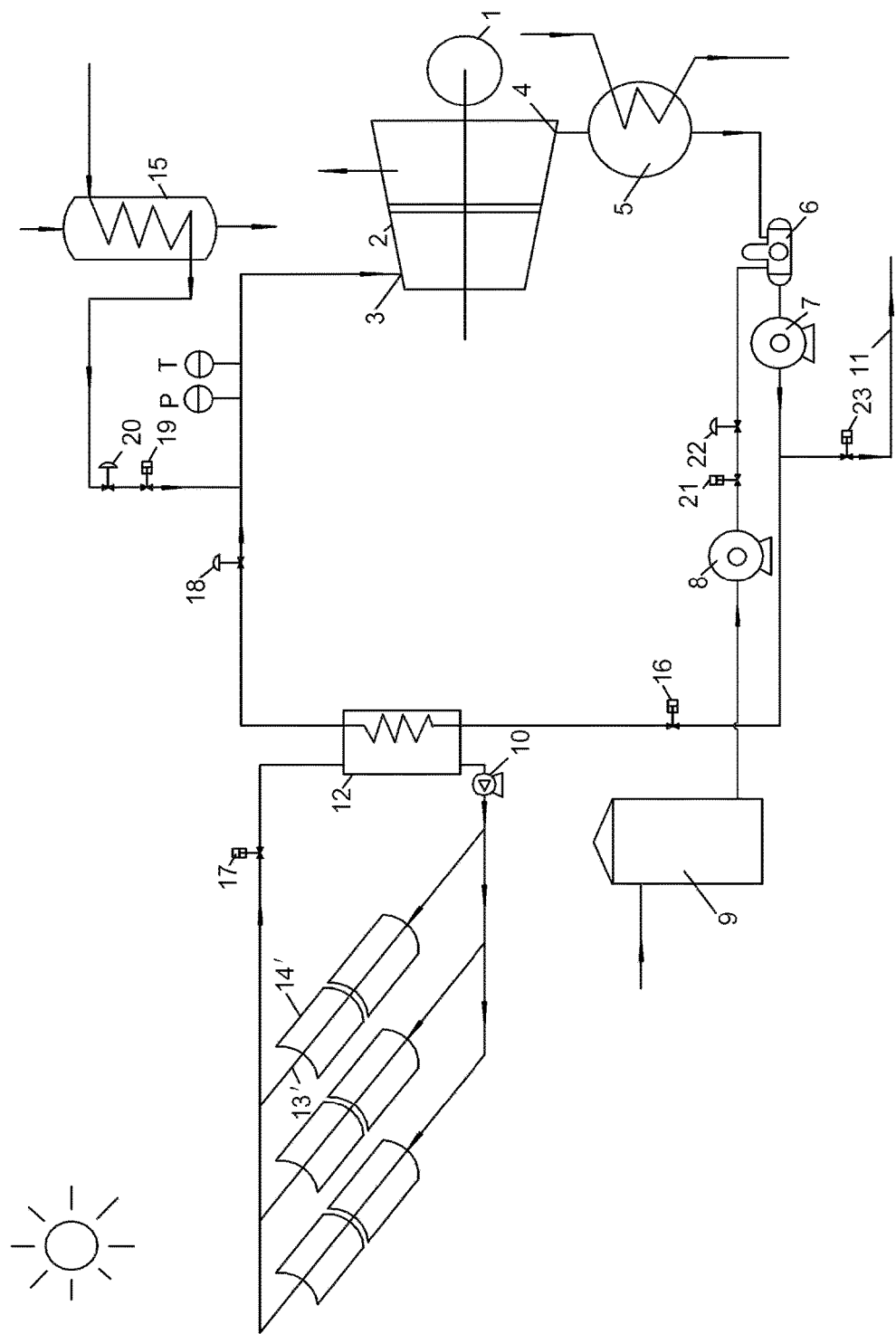
FIG. 4 is a schematic diagram of a solar and external steam hybrid power generation system according to Example 4 of the invention, in which, solar vacuum heat pipes matching trough type parabolic reflectors indirectly supplies steam for a turboset through heat exchange

As shown in FIG. 4, a structure of a solar and external steam hybrid power generation system is basically the same as that shown in FIG. 2 except for some slight variations that the solar steam generator comprises a plurality of solar vacuum heat pipes 13' and a plurality of trough type parabolic reflectors 14' matching therewith. Output ends of solar vacuum heat pipes 13' are connected to a thermal medium inlet of a regenerative heat exchanger 12 via a fifth switch valve 17. A thermal medium outlet of the regenerative heat exchanger 12 is connected to input ends of the solar vacuum heat pipes 13' via a heat pump 10. A steam outlet of the regenerative heat exchanger 12 is connected to the high pressure steam inlet 3 of the turboset 2 via the first regulating valve 18. A circulating water inlet of the regenerative heat exchanger 12 is connected to the output end of the water feed pump 7 via the first switch valve 16. Working processes of the two solar and external steam hybrid power generation systems are basically the same, so that it will not be repeatedly illustrated herein.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A solar and external steam hybrid power generation system, comprising:
   a) a solar steam generator for generating a steam by using solar energy;
   b) an external steam regulator, the external steam regulator comprising a heat exchanger;
   c) a turboset;
   d) a power generator, the power generator being coupled to the turboset;

e) a condenser;
f) a deaerator;
g) a water feed pump;
h) a first regulating valve;
i) a second regulating valve;
j) a first switch valve;
k) a second switch valve;
l) a third switch valve;
m) a fourth switch valve; and
n) a water-return bypass;
wherein:
  a steam outlet end of the solar steam generator is connected to a steam inlet of the turboset via the first regulating valve for sending the steam to the turboset;
  the external steam regulator is adapted to receive an industrial waste steam and regulate a pressure and a temperature of the industrial waste steam;
  the second regulating valve is adapted to adjust a flow rate of the industrial waste steam in real-time according to an intensity of sunlight;
  a steam outlet end of the external steam regulator is also connected to the steam inlet of the turboset via the second regulating valve and the second switch valve for sending the industrial waste steam to the turboset;
  a steam outlet of the turboset is connected to an input end of the condenser, and an output end of the condenser is connected to an input end of the deaerator;
  an output end of the deaerator is connected to an input end of the water feed pump;
  an output end of the water feed pump is connected to a circulating water input end of the solar steam generator via the first switch valve; and
  the output end of the water feed pump is further connected to the water-return bypass via the fourth switch valve.

2. The system of claim 1, further comprising a third regulating valve, a water supply pump, and a soft water storage tank, wherein a water outlet of the soft water storage tank is connected to a water inlet of the deaerator via the water supply pump, and a first pipe connecting the water outlet of the soft water storage tank and the water inlet of the deaerator is provided with the third regulating valve and the third switch valve.

3. The system of claim 2, wherein a second pipe is connected to the steam inlet of the turboset; and a pressure manometer and a thermometer are connected to the second pipe.

4. The system of claim 3, wherein
  the solar steam generator comprises an overhead solar boiler and a plurality of heliostats matching therewith;
  an output end of a heat pipe of the overhead solar boiler is connected to the steam inlet of the turboset via the first regulating valve; and
  an input end of the heat pipe of the overhead solar boiler is connected to the output end of the water feed pump via the first switch valve.

5. The system of claim 2, wherein
  the solar steam generator comprises an overhead solar boiler and a plurality of heliostats matching therewith;
  an output end of a heat pipe of the overhead solar boiler is connected to the steam inlet of the turboset via the first regulating valve; and
  an input end of the heat pipe of the overhead solar boiler is connected to the output end of the water feed pump via the first switch valve.

6. The system of claim 1, wherein
  the solar steam generator comprises an overhead solar boiler and a plurality of heliostats matching therewith;
  an output end of a heat pipe of the overhead solar boiler is connected to the steam inlet of the turboset via the first regulating valve; and
  an input end of the heat pipe of the overhead solar boiler is connected to the output end of the water feed pump via the first switch valve.

7. A solar and external steam hybrid power generation system, comprising:
a) a solar steam generator, the solar steam generator comprising an overhead solar boiler, a plurality of heliostats; and a regenerative heat exchanger;
b) an external steam regulator the external steam regulator comprising a heat exchanger;
c) a turboset;
d) a power generator, the power generator being coupled to the turboset;
e) a condenser;
f) a deaerator;
g) a water feed pump;
h) a first regulating valve;
i) a second regulating valve;
j) a first switch valve;
k) a second switch valve;
l) a third switch valve;
m) a fourth switch valve;
n) a fifth switch valve;
o) a water-return bypass; and
p) a heat pump;
wherein:
  the external steam regulator is adapted to receive an industrial waste steam and regulate a pressure and a temperature of the industrial waste steam;
  the regenerative heat exchanger is adapted to generate a steam;
  a steam outlet end of the external steam regulator is connected to a steam inlet of the turboset via the second regulating valve and the second switch valve;
  a steam outlet of the turboset is connected to an input end of the condenser, and an output end of the condenser is connected to an input end of the deaerator;
  an output end of the deaerator is connected to an input end of the water feed pump;
  an output end of the water feed pump is further connected to the water-return bypass via the fourth switch valve;
  an output end of a heat pipe of the overhead solar boiler is connected to a thermal medium inlet of the regenerative heat exchanger via the fifth switch valve, and a thermal medium outlet of the regenerative heat exchanger is connected to an input end of the heat pipe of the overhead solar boiler via the heat pump;
  a steam outlet of the regenerative heat exchanger is connected to the steam inlet of the turboset via the first regulating valve; and
  a circulating water inlet of the regenerative heat exchanger is connected to the output end of the water feed pump via the first switch valve.

8. The system of claim 7, further comprising a third regulating valve, a water supply pump, and a soft water storage tank, wherein a water outlet of the soft water storage tank is connected to a water inlet of the deaerator via the water supply pump, and a first pipe connecting the water outlet of the soft water storage tank and the water inlet of the deaerator is provided with the third regulating valve and the third switch valve.

9. The system of claim 8, wherein a second pipe is connected to the steam inlet of the turboset; and a pressure manometer and a thermometer are connected to the second pipe.

10. A solar and external steam hybrid power generation system, comprising:
 a) a solar steam generator;
 b) an external steam regulator the external steam regulator comprising a heat exchanger;
 c) a turboset, the turboset comprising a steam inlet and a steam outlet;
 d) a power generator, the power generator being coupled to the turboset;
 e) a condenser;
 f) a deaerator;
 g) a water feed pump;
 h) a first regulating valve;
 i) a second regulating valve;
 j) a first switch valve;
 k) a second switch valve;
 l) a third switch valve;
 m) a fourth switch valve; and
 n) a water-return bypass;
wherein:
 the external steam regulator is adapted to receive an industrial waste steam and regulate a pressure and a temperature of the industrial waste steam;
 a steam outlet end of the solar steam generator is connected to a steam inlet of the turboset via the first regulating valve;
 a steam outlet end of the external steam regulator is also connected to the steam inlet of the turboset via the second regulating valve and the second switch valve;
 a steam outlet of the turboset is connected to an input end of the condenser, and an output end of the condenser is connected to an input end of the deaerator;
 an output end of the deaerator is connected to an input end of the water feed pump;
 an output end of the water feed pump is connected to a circulating water input end of the solar steam generator via the first switch valve;
 the output end of the water feed pump is further connected to the water-return bypass via the fourth switch valve;
 the solar steam generator comprises a plurality of solar vacuum heat pipes and a plurality of trough type parabolic reflectors matching therewith;
 output ends of the solar vacuum heat pipes are connected to the steam inlet of the turboset via the first regulating valve; and
 input ends of the solar vacuum heat pipes are connected to the output end of the water feed pump via the first switch valve.

11. The system of claim 10, further comprising a third regulating valve, a water supply pump, and a soft water storage tank, wherein a water outlet of the soft water storage tank is connected to a water inlet of the deaerator via the water supply pump, and a first pipe connecting the water outlet of the soft water storage tank and the water inlet of the deaerator is provided with the third regulating valve and the third switch valve.

12. The system of claim 11, wherein a second pipe is connected to the steam inlet of the turboset; and a pressure manometer and a thermometer are connected to the second pipe.

13. A solar and external steam hybrid power generation system, comprising:
 a) a solar steam generator, the solar steam generator comprising a plurality of solar vacuum heat pipes, a plurality of trough type parabolic reflectors; and a regenerative heat exchanger;
 b) an external steam regulator the external steam regulator comprising a heat exchanger;
 c) a turboset;
 d) a power generator, the power generator being coupled to the turboset;
 e) a condenser;
 f) a deaerator;
 g) a water feed pump;
 h) a first regulating valve;
 i) a second regulating valve;
 j) a first switch valve;
 k) a second switch valve;
 l) a third switch valve;
 m) a fourth switch valve;
 n) a fifth switch valve;
 o) a water-return bypass; and
 p) a heat pump;
wherein:
 the external steam regulator is adapted to receive an industrial waste steam and regulate a pressure and a temperature of the industrial waste steam;
 the regenerative heat exchanger is adapted to generate a steam;
 a steam outlet end of the external steam regulator is connected to a steam inlet of the turboset via the second regulating valve and the second switch valve;
 a steam outlet of the turboset is connected to an input end of the condenser, and an output end of the condenser is connected to an input end of the deaerator;
 an output end of the deaerator is connected to an input end of the water feed pump;
 an output end of the water feed pump is further connected to the water-return bypass via the fourth switch valve;
 output ends of solar vacuum heat pipes are connected to a thermal medium inlet of the regenerative heat exchanger via the fifth switch valve, and a thermal medium outlet of the regenerative heat exchanger is connected to input ends of the solar vacuum heat pipes via the heat pump;
 a steam outlet of the regenerative heat exchanger is connected to the steam inlet of the turboset via the first regulating valve; and
 a circulating water inlet of the regenerative heat exchanger is connected to the output end of the water feed pump via the first switch valve.

14. The system of claim 13, further comprising a third regulating valve, a water supply pump, and a soft water storage tank, wherein a water outlet of the soft water storage tank is connected to a water inlet of the deaerator via the water supply pump, and a first pipe connecting the water outlet of the soft water storage tank and the water inlet of the deaerator is provided with the third regulating valve and the third switch valve.

15. The system of claim 14, wherein a second pipe is connected to the steam inlet of the turboset; and a pressure manometer and a thermometer are connected to the second pipe.

\* \* \* \* \*